(12) United States Patent
Taguchi et al.

(10) Patent No.: US 9,581,273 B2
(45) Date of Patent: Feb. 28, 2017

(54) FLUID FITTING

(71) Applicant: DAISEN Co., Ltd., Ota-shi (JP)

(72) Inventors: Hiroaki Taguchi, Ora-gun (JP); Toshiharu Horikoshi, Kiryu (JP); Yukio Yoshida, Kiryu (JP)

(73) Assignee: DAISEN Co., Ltd., Ota-shi (JP)

( * ) Notice: Subject to any disclaimer, the term of this patent is extended or adjusted under 35 U.S.C. 154(b) by 0 days.

(21) Appl. No.: 14/522,032

(22) Filed: Oct. 23, 2014

(65) Prior Publication Data
US 2016/0003396 A1    Jan. 7, 2016

(30) Foreign Application Priority Data

Jul. 3, 2014   (JP) .................. 2014-138007

(51) Int. Cl.
| F16L 37/47 | (2006.01) |
| F16L 37/50 | (2006.01) |
| F16L 27/073 | (2006.01) |
| F16L 55/07 | (2006.01) |
| F16L 37/407 | (2006.01) |
| F16L 19/00 | (2006.01) |

(52) U.S. Cl.
CPC ............ *F16L 37/47* (2013.01); *F16L 27/073* (2013.01); *F16L 37/50* (2013.01); *F16L 55/07* (2013.01); *F16L 19/00* (2013.01); *F16L 37/407* (2013.01)

(58) Field of Classification Search
CPC ... F16L 27/0849; F16L 27/0804; F16L 27/02; F16L 37/256; F16L 37/28; F16L 37/38; F16L 37/40; F16L 37/42; F16L 37/53; F16L 37/52; F16L 37/47
See application file for complete search history.

(56) References Cited

U.S. PATENT DOCUMENTS

| 5,050,841 A * | 9/1991 | Jacobsson ............... F16L 37/47 251/149.9 |
| 2002/0062872 A1* | 5/2002 | Makishima ............. F16L 37/47 137/616.7 |
| 2004/0051070 A1* | 3/2004 | Mikiya ................... F16L 37/47 251/149.8 |
| 2004/0134544 A1* | 7/2004 | Mikiya ................... F16K 5/061 137/616.7 |
| 2004/0239111 A1* | 12/2004 | Wuthrich ................ F16L 37/47 285/283 |

FOREIGN PATENT DOCUMENTS

JP    2002-168387    6/2002

* cited by examiner

*Primary Examiner* — Daniel P Stodola
*Assistant Examiner* — Zachary Dragicevich
(74) *Attorney, Agent, or Firm* — Morrison & Foerster LLP

(57) ABSTRACT

A fluid fitting of an embodiment mainly includes a socket part, a spherical valve inserted in the socket part, and a plug part configured to be inserted at a tip portion thereof into the spherical valve. Moreover, the plug part is fixed in the direction of turn by engaging an expanded-diameter portion of the plug part with a recess of the socket part. Thus, the plug part is prevented from being detached from the socket part while the fluid fitting is in use.

7 Claims, 5 Drawing Sheets

FLUID FITTING

This application claims priority from Japanese Patent Application Number JP 2014-138007 filed on Jul. 3, 2014, the content of which is incorporated herein by reference in its entirety.

BACKGROUND OF THE INVENTION

1. Field of the Invention

The present invention relates to a fluid fitting interposed between hoses connecting a fluid supply source such as a compressor and a fluid using device such as a nail gun.

2. Description of the Related Art

As a conventional technique, a fluid fitting is interposed between hoses serving as paths which compressed air to be supplied to a compressed-air using device passes through.

Such a fluid fitting is generally formed of a plug and a socket. Japanese Patent Application Publication No. 2002-168387 discloses a pipe fitting which allows attachment and detachment of a plug and a socket by turning the plug about the socket. Specifically, referring FIGS. 6 and 7 and paragraphs explaining them, a pipe fitting is formed of a socket 1 and a plug 2, and a ball valve 6 is rotatably incorporated in the socket 1. While the pipe fitting is in use, a tip portion of the plug 2 is inserted in a plug-insertion-side opening portion 5a of the ball valve 6, and the plug 2 and the ball valve 6 are turned, to thereby set the pipe fitting in a communicating state. In addition, there is also provided ball-valve turn restricting means for restricting the direction of turn of the ball valve 6. By employing the pipe fitting with such a configuration, the plug 2 can be attached to and detached from the socket 1 only by a turning action of the plug 2 about the socket 1. Thus, the pipe fitting can be operated easily.

The pipe fitting described in Japanese Patent Application Publication No. 2002-168387 includes means for restricting the direction of turn of the ball valve 6, but there is no description about restriction of the turn itself. Thus, there is a possibility that the plug 2 may be turned unnecessarily and detached from the socket 1 upon application of an external force to the fitting in use with the two parts connected to each other.

SUMMARY OF THE INVENTION

The present invention has been made in view of this problem, and an object of the present invention is to provide a fluid fitting which prevents detachment of a plug part and a socket part from each other while the fluid fitting is in use.

A fluid fitting of the present invention is a fluid fitting to be interposed between paths for supplying a fluid, including: a socket part; and a plug part configured to be inserted at a tip portion thereof in the socket part, in which the socket part includes a first base part of a substantially cylindrical shape having an opening portion extending from a tip portion to a side portion thereof, a second base part of a substantially cylindrical shape having a tip portion thereof inserted in the first base part, and a spherical valve of a spherical shape which is incorporated in the first base part and in which an insertion hole for inserting the tip portion of the plug part is formed, the fluid fitting is set in a blocking state where the supply of the fluid is blocked, by turning the spherical valve to orient the insertion hole to a lateral side of the socket part, the fluid fitting is set in a communicating state where the socket part and the plug part communicate with each other, by inserting the tip portion of the plug part into the opening portion of the spherical valve and turning the plug part along the opening portion, and the fluid fitting is set in a fixed state where the plug part is fixed in the direction of the turn, by moving the plug part in a direction away from the socket part to thereby engage an expanded-diameter portion of the plug part with an inner wall of the first base part.

DESCRIPTION OF THE INVENTION

Figure 1:
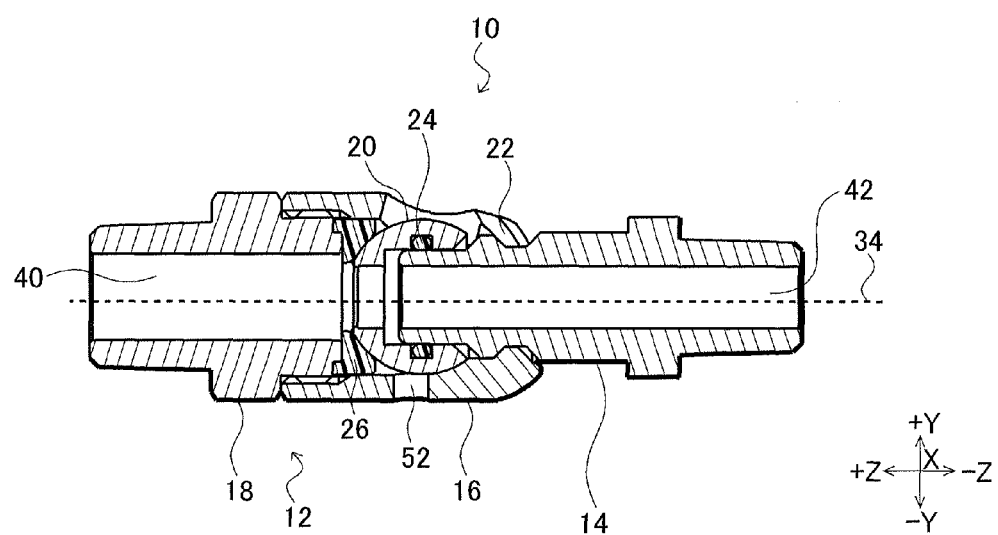
FIG. 1 is a cross-sectional view showing a fluid fitting of the present invention.

The configuration of a fluid fitting 10 according to an embodiment will be described with reference to FIG. 1. FIG. 1 is a cross-sectional view of the fluid fitting 10 taken along an axial line 34 which is the center line of a pipe part of the fluid fitting 10.

The fluid fitting 10 of this embodiment mainly includes a socket part 12, a spherical valve 20 inserted in the socket part 12, and a plug part 14 configured to be inserted at a tip portion thereof into the spherical valve 20. The fluid fitting 10 essentially serves to connect hoses (paths) which connect a fluid supply source such as a compressor and a fluid using device such as a nail gun, by being interposed between these hoses. This embodiment will describe a case where compressed air is employed as the fluid that flows through the fluid fitting 10, but a gas other than air or a liquid may instead be employed.

The following description will be given by using X, Y, and Z directions when appropriate. The X and Y directions each represent the radial direction of the pipe part of the fluid fitting 10, and the Z direction represents the axial direction of the pipe part of the fluid fitting. In the fluid fitting 10 of this embodiment, compressed air flows from the −Z side to the +Z side. Specifically, the socket part 12 is connected to compressed-air supplying means such as a compressor through a hose, while the plug part 14 is connected to compressed-air using means such as a nail gun through a hose. Here, in the fluid fitting 10 in the state shown in FIG. 1, a flow path 40 inside the socket part 12 and a flow path 42 inside the plug part 14 communicate with each other.

The socket part 12 is a member having a substantially cylindrical shape with its axial line 34 extending along the Z direction, and is formed of a first base part 16 and a second base part 18 connected to each other. Further, in the first base part 16, an opening portion 22 is formed which is opened at an end portion of the first base part 16 on the −Z side. The first base part 16 incorporates the spherical valve 20 and a packing 26. The configuration of the socket part 12 will be described later with reference to FIGS. 2A and 2B.

The plug part 14 is a member having a substantially cylindrical shape with its axial line 34 extending along the Z direction, and its end portion on the +Z side is inserted in the spherical valve 20 in the socket part 12. The configuration in which the plug part 14 is inserted and fitted in the socket part 12 will be described later with reference to FIGS. 4A and 4B and other drawings.

Figure 2A:
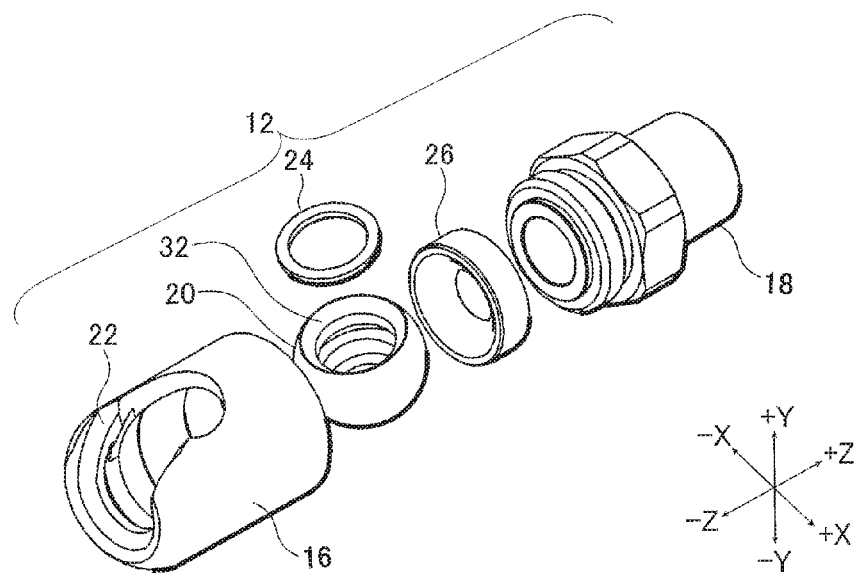
FIGS. 2A and 2B are views showing the fluid fitting of the present invention, FIG. 2A being a perspective view showing a socket part disassembled, and FIG. 2B being a perspective view showing a first base part.
Figure 2B:
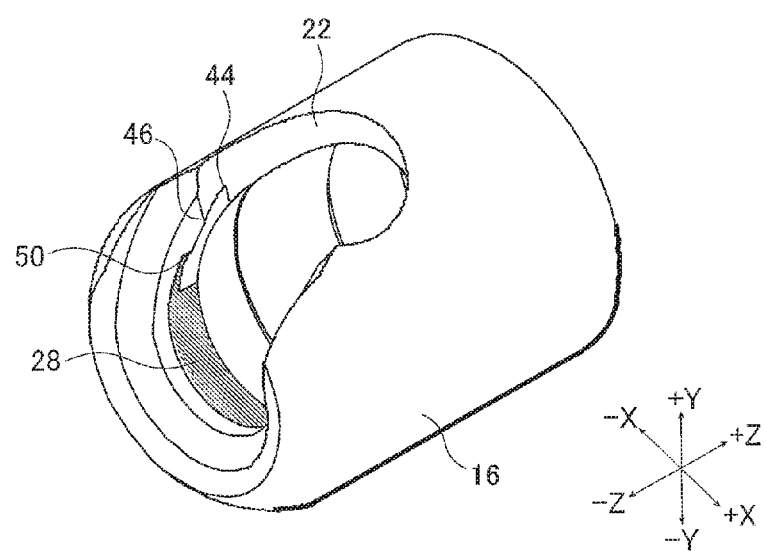

The configuration of the above socket part 12 will be described in detail with reference to FIGS. 2A and 2B. FIG. 2A is a perspective view showing the socket part 12 in a disassembled state. FIG. 2B is a perspective view showing the first base part 16 that forms the socket part 12.

Referring to FIG. 2A, in the socket part 12, an end portion of the second base part 18 on the −Z side is inserted in the first base part 16 to form a pipe part of the socket part 12. Here, the first base part 16 and the second base part 18 are connected by screwing the end portion of the second base part 18 on the −Z side into an end portion of the first base part 16 on the +Z side.

The first base part 16 incorporates the spherical valve 20 and the packing 26. Moreover, the opening portion 22 is formed which is opened continuously from the end of the first base part 16 on the −Z side to a side portion thereof. The plug part 14 is turned in a later-described manner along this opening portion 22.

The spherical valve 20 is of a metallic material such as stainless steel cut in such a way as to have a spherical outer shape. An insertion hole 32 is formed in the spherical valve 20. The insertion hole 32 penetrates through the spherical valve 20 from the +Y side to the −Y side in the state shown in FIG. 2A. The insertion hole 32 is a hole in which to insert the tip portion of the plug part 14 shown in FIG. 1, and forms part of a path which compressed air flows through at the time of purging to be described later. The surface of the spherical valve 20 on the +Z side is in contact with the packing 26, while the surface thereof on the −Z side is in contact with the inner wall of the first base part 16. Also, a groove is formed annularly in the inner wall of the spherical valve 20, and an O-ring 24 is disposed in this groove. The O-ring 24 is obtained by molding a rubber-based resin material into a ring shape, and is disposed in the inner wall of the spherical valve 20 for the purpose of ensuring airtightness.

The packing 26 is made of a rubber-based material or a plastic-based material molded in an annular shape. The main surface of the packing 26 on the +Z side is a flat surface and is in contact with the end of the second base part 18 on the −Z side. Moreover, the main surface of the packing 26 on the −Z side is a spherically curved surface and is in contact with the surface of the spherical valve 20. As the material of the packing 26, a rubber-based material (elastomer) is preferable in view of airtightness, and acrylonitrile butadiene rubber (NBR) may be employed, for example.

Referring to FIG. 2B, the opening portion 22 is formed which is opened continuously from the end of the second base part 18 on the −Z side to the side portion thereof. A reduced-diameter portion 46 with a reduced inner diameter is formed in the vicinity of the tip of the opening portion 22 on the −Z side. The diameter of the reduced-diameter portion 46 is smaller than that of an expanded-diameter portion 30 of the plug part 14, but larger than that of a reduced-diameter portion 48 of the plug part 14. The expanded-diameter portion 30 and the reduced-diameter portion 48 will be described later with reference to FIG. 3A. An expanded-diameter portion 44 with a larger diameter than that of the reduced-diameter portion 46 is formed on the +Z side of the reduced-diameter portion 46. The diameter of the reduced-diameter portion 46 of the first base part 16 is slightly larger than that of the expanded-diameter portion 30 of the plug part 14 shown in FIG. 3A. By providing the reduced-diameter portion 46 and the expanded-diameter portion 44 as mentioned above at the end portion of the inner wall of the first base part 16, the tip portion of the plug part 14 shown in FIG. 3A can be fitted to the first base part 16.

Part of the joint of the reduced-diameter portion 46 and the expanded-diameter portion 44 is expanded outwardly in the radial direction to thereby form a recess 28 there. This recess 28 serves to fix the expanded-diameter portion 30 of the plug part 14 shown in FIG. 3A in the direction of turn thereof. Upper end portions 50 of the recess 28 are disposed above the center of the first base part 16 in the Y direction. In this way, the expanded-diameter portion 30 of the plug part 14 can be fixed more reliably. Details of this fixing structure will be described later with reference to FIGS. 4A and 4B and other drawings.

Moreover, the inner wall of the first base part 16 on the −Z side from the expanded-diameter portion 44 has a curved surface which comes into surface contact with the outer surface of the above-described spherical valve 20.

A method of connection in the above-described fluid fitting 10 will be described with reference to FIGS. 3A to 5B.

The state of the fluid fitting 10 of this embodiment ranges from a blocking state where the socket part 12 and the plug part 14 are separated from each other and do therefore not communicate with each other, to a communicating state where the socket part 12 and the plug part 14 communicate with each other as a result of inserting the plug part 14 into the socket part 12 and turning the plug part 14, to a fixed state where the plug part 14 is fixed in the direction of the turn as a result of moving the plug part 14 in a direction away from the socket part 12.

The blocking state will be described with reference to FIGS. 3A and 3B. In this state, the plug part 14 and the socket part 12 are separated from each other. Also, the insertion hole 32 of the spherical valve 20 incorporated in the socket part 12 has its opening facing upwardly and exposed to the outside through the opening portion 22 of the first base part 16. Further, the surface of the spherical valve 20 on the +Z side is in surface contact with the curved surface of the packing 26. Furthermore, the flow path 40 in the socket part 12 is closed by the surface of the spherical valve 20. Thus, the flow path 40 formed by the internal space of the second base part 18 is blocked. For this reason, even if compressed air is supplied from the compressor connected to the socket part 12 through the hose (not shown), the compressed air will not leak out since the flow path 40 is blocked.

The diameter of the tip portion of the plug part 14 is set slightly smaller than the inner diameter of the opening portion 22 so that the tip portion can be inserted in the insertion hole 32 of the spherical valve 20. Moreover, the expanded-diameter portion 30 and the reduced-diameter portion 48 are formed continuously with each other on the tip portion of the plug part 14. The plug part 14 is fixed to the socket part 12 in the axial direction when the constriction formed by the expanded-diameter portion 30 and the reduced-diameter portion 48 is engaged with the recess 28 (see FIG. 2B) formed in the opening portion 22.

Figure 3A:
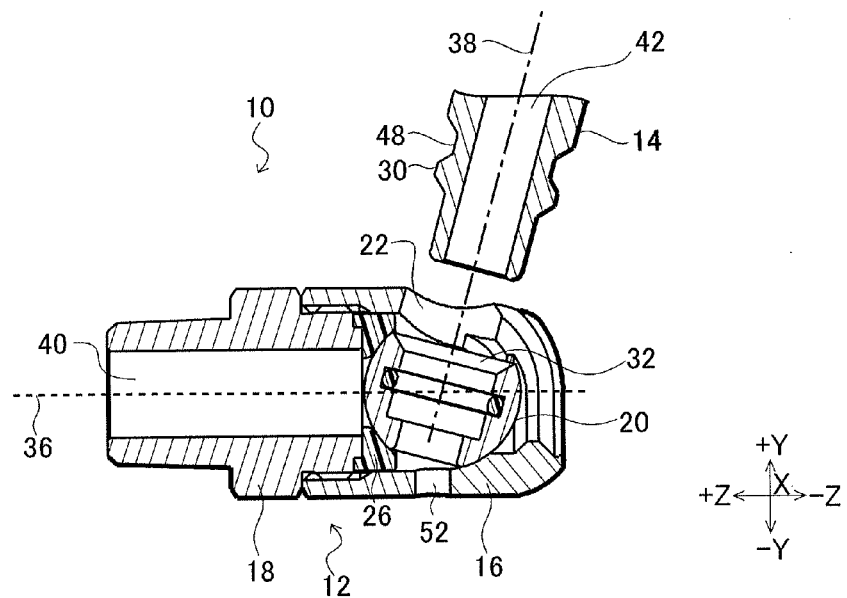
FIGS. 3A and 3B are views showing the fluid fitting of the present invention, and are cross-sectional views sequentially showing how a plug part is connected to the socket part.
Figure 3B:
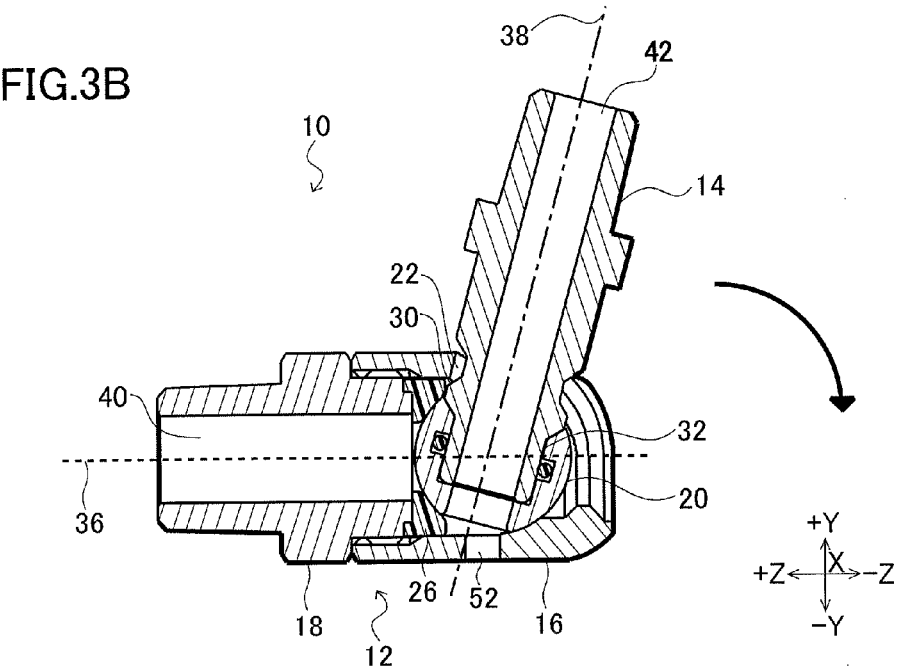

Then, referring to FIG. 3B, the tip portion of the plug part 14 is inserted into the insertion hole 32 of the spherical valve 20 incorporated in the socket part 12. Thereafter, the plug part 14 is turned clockwise about the socket part 12. In other words, the plug part 14 is turned along the opening portion 22 so that an axial line 36 which is the center axis of the socket part 12 and an axial line 38 which is the center axis of the plug part 14 can coincide with each other. As a result, the spherical valve 20 turns clockwise inside the socket part 12 together with the plug part 14. In this turn, the spherical valve 20 turns by sliding on the surface of the packing 26. Thus, there is basically no possibility of compressed air leaking out from between the spherical valve 20 and the packing 26.

Figure 4A:
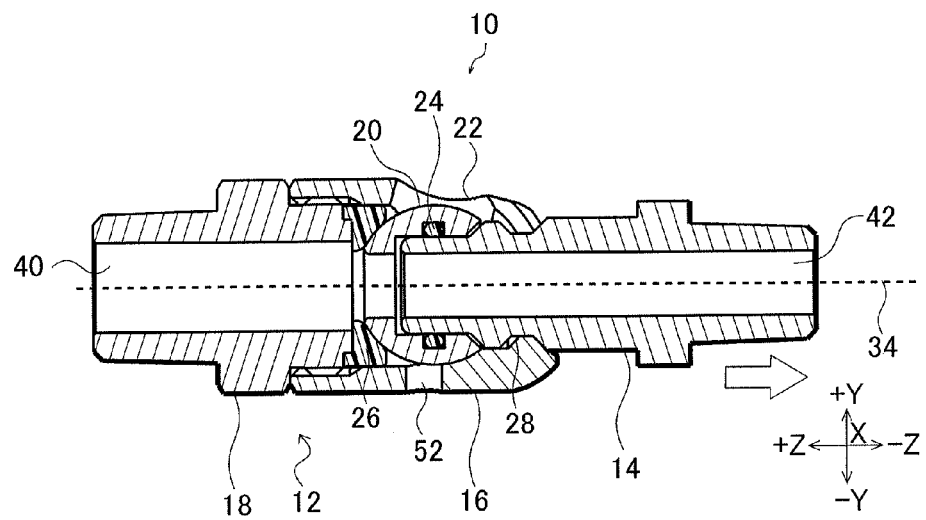
FIGS. 4A and 4B are views showing the fluid fitting of the present invention, FIG. 4A being a cross-sectional view showing the fluid fitting in a communicating state, and FIG. 4B being an enlarged cross-sectional view of an area where the plug part is inserted.

Referring to FIG. 4A, as the above-described turn of the plug part 14 is continued further, the center axis of the socket part 12 and the center axis of the plug part 14 coincide with each other at the axial line 34, so that they are set in the communicating state. Thus, the flow path 40 which is the internal space of the socket part 12 and the flow path 42 which is the internal space of the plug part 14 communicate with each other. Accordingly, compressed air supplied from the compressor connected to the socket part 12 side is supplied to a nail gun or the like connected to the plug part 14 side through the flow path 40 in the socket part 12 and the flow path 42 in the plug part 14.

Figure 4B:
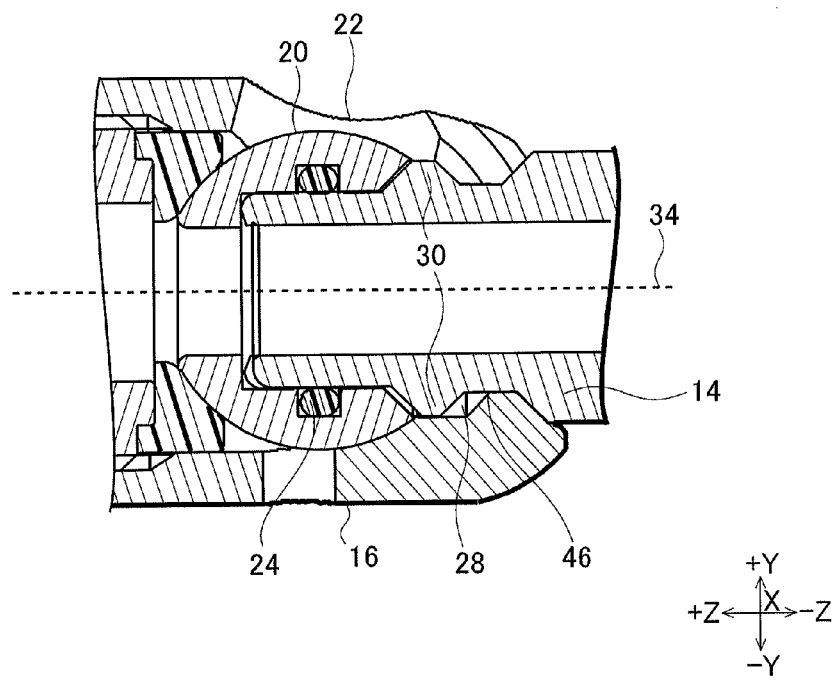

FIG. 4B is an enlarged cross-sectional view showing the area where the plug part 14 is inserted. Referring to this drawing, the reduced-diameter portion 46 to be fitted to the expanded-diameter portion 30 of the plug part 14 is formed in the vicinity of the tip of the first base part 16. Here, the expanded-diameter portion 30 of the plug part 14 and the reduced-diameter portion 46 of the first base part 16 are separated and not engaged with each other, when the plug part 14 is only turned to make the axial lines of the socket part 12 and the plug part 14 coincide with each other as described above. In other words, the recess 28 of the first base part 16 is present between the reduced-diameter portion 46 of the first base part 16 and the expanded-diameter portion 30 of the plug part 14. Thus, the plug part 14 can still be turned and is not fixed in the direction of the turn.

Figure 5A:
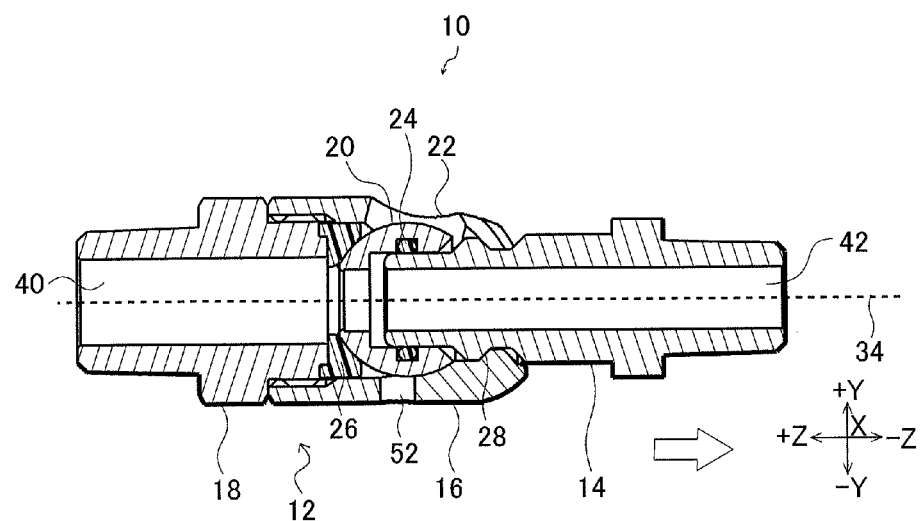
FIGS. 5A and 5B are views showing the fluid fitting of the present invention, FIG. 5A being a cross-sectional view showing the fluid fitting in a fixed state, and FIG. 5B being an enlarged cross-sectional view of the area where the plug part is inserted.
Figure 5B:
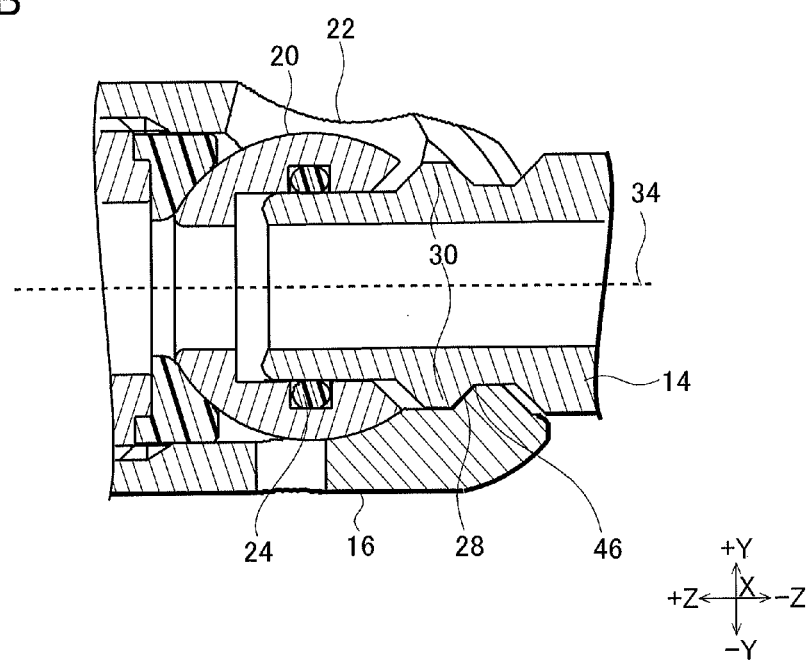

The fixed state where the plug part 14 is fixed in the direction of the turn will be described with reference to FIGS. 5A and 5B. FIG. 5A is a cross-sectional view showing the fluid fitting 10 in this state. FIG. 5B is an enlarged cross-sectional view showing the area where the plug part 14 is inserted.

Referring to FIG. 5A, the plug part 14 in the above-described communicating state is moved in the −Z direction away from the socket part 12. In this step, the tip portion of the plug part 14 and the inner wall of the spherical valve 20 slide on each other but, with the O-ring 24 disposed between the tip portion and the inner wall, compressed air is prevented from leaking out from between them.

Referring to FIG. 5B, by the above step, the expanded-diameter portion 30 of the plug part 14 is fitted to the recess 28 of the first base part 16. As shown in FIG. 2B, the upper end portions 50 of the recess 28 of the first base part 16 are disposed above the center of the inner wall of the first base part 16. Thus, a half or more of the expanded-diameter portion 30 of the plug part 14 in the circumferential direction is fitted to the recess 28 formed in such a manner, so that the plug part 14 is fixed in the direction of the turn. Accordingly, even if an external force is applied to the fluid fitting 10 in use, the plug part 14 will not be turned unnecessarily, thereby preventing detachment of the plug part 14 and the socket part 12 from each other.

Here, the movement of the plug part 14 may be done by the compressive force of compressed air supplied to the flow path 40 or the like, or by the user's operation on the plug part 14.

In the above description, the method of connection in the fluid fitting 10 via sequential transitions from the blocking state through the communicating state to the fixed state is explained. The reversed steps are employed for separating the fluid fitting 10. That is, the fluid fitting 10 is separated via transitions from the fixed state through the communicating state to the blocking state.

Specifically, referring to FIG. 5A, in the fixed state, the plug part 14 is pushed into the socket part 12. As a result, referring to FIG. 4B, the expanded-diameter portion 30 of the plug part 14 is separated from the reduced-diameter portion 46 of the first base part 16, so that the plug part 14 becomes turnable about the first base part 16.

Then, as shown in FIG. 3B, the plug part 14 is turned counterclockwise about the socket part 12. As a result, the flow path 42 of the plug part 14 communicates with the outside through a hole portion 52 of the socket part 12, so that compressed air remaining in the hose connected to the plug part 14 is discharged to the outside through the hole portion 52. This process is generally called purging.

Lastly, as shown in FIG. 3A, the tip portion of the plug part 14 is pulled out of the spherical valve 20 in the socket part 12, so that the socket part 12 and the plug part 14 are detached from each other.

The fluid fitting of this embodiment described above can be modified as follows, for example.

Referring to FIG. 4A, in the fluid fitting 10 in the communicating state, the center axis of the socket part 12 and the center axis of the plug part 14 coincide with each other. However, these center axes do not necessarily need to coincide with each other. For example, even in the communicating state, the center axis of the socket part 12 and the center axis of the plug part 14 may cross each other at a predetermined angle.

According to the present invention, by inserting the tip portion of the plug part into the insertion hole of the spherical valve incorporated in the socket part and by turning the plug part, the socket part and the plug part are set in the communicating state. Further, the expanded-diameter portion of the plug part is engaged with the inner wall of the socket part. This engagement structure prevents the plug part from being turned about the socket part and these two parts from being detached from each other while the fluid fitting is in use.

What is claimed is:
1. A fluid fitting to be interposed between paths for supplying a fluid, comprising:
   a socket part; and
   a plug part inserted at a tip portion thereof in the socket part,
   wherein the socket part comprises,
      a first base part of a cylindrical shape having an opening portion extending from a tip portion to a side portion thereof, the opening portion including at the tip portion of the first base part a reduced-diameter opening portion, an expanded-diameter opening portion and a recess defined by an inclined surface connecting the reduced-diameter opening portion and the expanded-diameter opening portion,
      a second base part of a cylindrical shape having a tip portion thereof inserted in the first base part, and
      a spherical valve of a spherical shape which is incorporated in the first base part and in which an insertion hole for inserting the tip portion of the plug part is formed, the fluid fitting is set in a blocking state where supply of the fluid is blocked, by turning the spherical valve to orient the insertion hole to a lateral side of the socket part, the fluid fitting is set in a communicating state where the socket part and the plug part communicate with each other, by inserting the tip portion of the plug part into the opening portion of the spherical valve and turning the plug part along the opening portion, the fluid fitting is set in a fixed state where the plug part is fixed so as not to be turned, by moving the plug part in an axial direction of the socket part away from the socket part toward the recess to thereby engage an expanded-diameter portion of the plug part with an inner wall of the first base part, and the fluid fitting transitions from the blocking state to the communicating state, and the fluid fitting transitions from the communicating state to the fixed state such that the plug part is moved toward the recess by a flow of the fluid flowing through the paths.

2. The fluid fitting according to claim 1, wherein the socket part further includes a packing disposed inside the first base part between the spherical valve and the tip portion of the second base part, and the packing is made of a rubber material.

3. The fluid fitting according to claim 1, wherein in the communicating state, the axial direction of the socket part and an axial direction of the plug part substantially coincide with each other.

4. The fluid fitting according to claim 1, wherein in the fixed state, the expanded-diameter portion of the plug part is fitted to the recess formed by partly indenting the inner wall of the first base part.

5. The fluid fitting according to claim 4, wherein a half or more of the expanded-diameter portion of the plug part in a circumferential direction is fitted to the recess of the first base part.

6. The fluid fitting according to claim 1, wherein an O-ring is disposed in an inner wall of the spherical valve.

7. The fluid fitting according to claim 1, wherein in a transition from the fixed state to the communicating state, a hole portion penetrating through a side wall of the first base part and the insertion hole of the spherical valve communicate with each other, so that the fluid filled in the path on the plug part side is discharged to an outside through the hole portion.

* * * * *